US011634186B2

(12) United States Patent
Packeiser et al.

(10) Patent No.: US 11,634,186 B2
(45) Date of Patent: Apr. 25, 2023

(54) TUGGER TRAIN TRAILER, TRANSPORT SYSTEM, AND TRANSPORT METHOD

(71) Applicant: LR Intralogistik GmbH, Woerth an der Isar (DE)

(72) Inventors: Andreas Packeiser, Winsen (DE); Fritz Berghammer, Landshut (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 1128 days.

(21) Appl. No.: 16/320,200

(22) PCT Filed: Jun. 22, 2017

(86) PCT No.: PCT/EP2017/065432
§ 371 (c)(1),
(2) Date: Jan. 24, 2019

(87) PCT Pub. No.: WO2018/019495
PCT Pub. Date: Feb. 1, 2018

(65) Prior Publication Data
US 2019/0225285 A1    Jul. 25, 2019

(30) Foreign Application Priority Data
Jul. 28, 2016 (DE) .................... 10 2016 113 972.6

(51) Int. Cl.
*B62D 53/00* (2006.01)
*B60P 1/44* (2006.01)
*B66F 9/06* (2006.01)
*F41H 7/00* (2006.01)

(52) U.S. Cl.
CPC .............. *B62D 53/005* (2013.01); *B60P 1/44* (2013.01); *B66F 9/063* (2013.01); *F41H 7/005* (2013.01)

(58) Field of Classification Search
CPC ............................ B66F 9/063; B62D 53/005
See application file for complete search history.

(56) References Cited

U.S. PATENT DOCUMENTS

| 4,127,202 A | * | 11/1978 | Jennings ................ B60D 1/173 |
| | | | 414/537 |
| 10,052,995 B2 | * | 8/2018 | Berghammer ............ B60P 1/02 |
| 10,683,042 B2 | * | 6/2020 | Stockrahm ......... B62D 33/0207 |
| 2009/0115161 A1 | * | 5/2009 | Sato .................... B62D 49/0685 |
| | | | 280/400 |
| 2011/0056760 A1 | | 3/2011 | Schendel et al. |
| 2017/0088156 A1 | * | 3/2017 | Ard .......................... B62B 5/00 |

FOREIGN PATENT DOCUMENTS

| DE | 102012017838 A1 | 3/2014 | |
| EP | 2161182 A2 | 10/2010 | |
| EP | 2803562 A2 | 11/2011 | |
| JP | 2013232078 A | 11/2013 | |
| WO | 2015149892 A1 | 10/2015 | |
| WO | WO-2015149892 A1 | * 10/2015 | ................ B60P 1/02 |

* cited by examiner

*Primary Examiner* — Kaitlin S Joerger
(74) *Attorney, Agent, or Firm* — The Webb Law Firm

(57) ABSTRACT

A tugger train trailer is disclosed, including a frame and drive-on surfaces for holding a trolley cart. Transport vehicle drive-on surfaces for an autonomous transport vehicle moving the trolley cart are also provided such that a unit of trolley cart and autonomous transport vehicle can drive on the drive-on surfaces.

15 Claims, 3 Drawing Sheets

TUGGER TRAIN TRAILER, TRANSPORT SYSTEM, AND TRANSPORT METHOD

CROSS-REFERENCE TO RELATED APPLICATIONS

This application is the United States national phase of International Application No. PCT/EP2017/065432 filed Jun. 22, 2017, and claims priority to German Patent Application No. 10 2016 113 972.6 filed Jul. 28, 2016, the disclosures of which are hereby incorporated by reference in their entirety.

BACKGROUND OF THE INVENTION

Field of the Invention

The invention relates to a tugger train trailer as well as a transport system and a transport method. The invention relates in particular to tugger train trailers with a frame and drive-on surfaces to accommodate a trolley cart, a corresponding autonomous transport vehicle, a corresponding transport system and a transport method.

Description of the Related Art

For the internal transport of loads that are stored on pallets, in mesh boxes or on trolley carts, the use of tugger trains is becoming increasingly common, in which the pallets, mesh boxes or trolley carts are transported on trailers. The trailers are combined into a train and pulled by an industrial tractor. A trolley cart is conventionally equipped with at least two steerable wheels and has a total of four wheels. Employees in the production department can therefore easily manually push the trolley cart into the desired position for the removal of the load it is carrying. A typical embodiment consists of a mesh box or carrier for a plurality of plastic drawers to hold small parts. The trolley carts are moved as part of the tugger train not on their own wheels but are raised to achieve improved tracking and guidance of the tugger train trailers lined up one after the other when their wheels or axles are loaded with the full weight.

EP 2 161 182 A2 describes a tugger train trailer that can transport a trolley cart that is raised during transport.

In the known methods for the transport of goods, e.g. on production lines, tugger trains are increasingly being used because instead of a plurality of industrial trucks such as fork lifts, for example, a single tugger train can transport a larger quantity of goods. The tugger train arrives at a distribution point in which the employees remove the trolley carts from the tugger train trailers and move them to their desired final position. Simultaneously or subsequently the unloaded trolley carts or transport containers are loaded back onto the tugger train.

This method of the prior art requires a relatively long stop at the distribution point as well as a relatively great deal of time and effort on the part of the employees.

The prior art also describes the use of driverless transport systems without remote controls or control by a person traveling with the train or a driver that autonomously arrive on their own at destinations within an operating site. In particular, systems of this type include autonomous transport vehicles that can transport a cargo carrier such as a pallet, mesh box or trolley cart, for example. In one embodiment of the prior art, these systems transport a trolley cart so that the autonomous transport vehicles have a very flat design, can be driven as an undermount vehicle underneath the trolley carts and can lift them. The prior art also describes an additional embodiment in which autonomous transport vehicles run halfway under the trolley carts and by means of a coupling connection with a vertical axis of rotation located above the autonomous transport vehicle or on the underside of the trolley cart can move the trolley cart on its own wheels as a tractor vehicle.

These autonomous transport vehicles have a very compact construction and the capacity of the traction battery of these vehicles is therefore very limited simply on account of the space available. One disadvantage of these transport vehicles of the prior art is therefore that only very low speeds of travel are possible. The result is a high volume of traffic as a result of the large number of autonomous transport vehicles with their individual loads and trolley carts and because they can move along the roadways only at low speed. Over longer transport distances, there is frequently also the problem of low ground clearances of the autonomous transport vehicles and the lack of the option to use roads outside buildings on the industrial site, which are more uneven and are exposed to the weather.

SUMMARY OF THE INVENTION

Therefore the object of this invention is to make available a tugger train trailer, a transport system, an autonomous transport vehicle and a transport method with which the disadvantages described above can be overcome and that make possible an optimized use of the autonomous transport vehicles.

The object is accomplished by the invention in the form of a tugger train trailer with a frame and drive-on surfaces to accommodate a trolley cart and additional transport vehicle drive-on surfaces for an autonomous transport vehicle that moves the trolley car, so that a unit consisting of a trolley cart and autonomous transport vehicle can drive on.

The tugger train trailers according to the invention can advantageously travel long distances in a tugger train without discharging a traction battery of the autonomous transport vehicle. Only in the vicinity of a destination or distribution point are the trolley carts transported by the autonomous transport vehicles and a load is placed on their traction battery. It is also conceivable to use trolley carts that transport the load and can simultaneously run autonomously. In such a case, the autonomous transport vehicle and the trolley cart are identical. The autonomous transport vehicles with the trolley carts need only travel short distances. With the solution described above, an effective subdivision of cargo at the distribution point becomes possible in combination with efficient transport over long distances. As a result of the additional transport vehicle drive-on surfaces provided, it becomes possible in particular to drive the autonomous transport vehicles described in the form of undermount vehicles together with a trolley cart onto the tugger train trailer. These are typically located between the track of the outboard wheels of the trolley carts and as a result of the presence of the additional transport vehicle drive-on surfaces together with the trolley carts can move the trolley carts into a parked position on the tugger train trailer.

The drive-on surfaces and transport vehicle drive-on surfaces advantageously form a continuous floor surface.

The result is an advantageously large surface with which different types of trolley carts can be transported.

In one advantageous development, the drive-on surfaces and transport vehicle drive-on surfaces can be lowered flush with the floor and raised.

In one advantageous configuration, the drive-on surfaces and transport vehicle drive-on surfaces are solidly connected with the frame, and lifting devices are provided between the frame and the wheels of the tugger train trailer.

Electrical charging contacts can be located so that the autonomous transport vehicle can charge its traction battery with mating contacts in a parked position in the tugger train trailer.

If the autonomous transport vehicles described above with a trolley cart run all the way onto the tugger train trailer, they are in a typical parked position. Normally, the combination of an autonomous transport vehicle and the trolley cart will always drive on in one direction. For example, it is logical, if the autonomous transport vehicle tows the trolley cart by means of a coupling connection, if the unit with the trolley cart is pushed forward by the autonomous transport vehicle onto the tugger train trailer, because that allows maximum maneuverability.

The charging contacts are advantageously located so that contact takes place only in the correct orientation of the autonomous transport vehicle, in particular when the charging contacts are oriented asymmetrically with regard to a longitudinal axis of the parked position in a drive-in direction of the autonomous transport vehicle.

It is therefore advantageously ensured that there can be no incorrect polarity. In particular, because as described above the autonomous transport vehicles in the unit with the trolley cart generally drive onto the tugger train trailer in one direction, generally "backwards", a correct polarity is achieved as the result of an asymmetrical orientation of the contacts. It is also conceivable to determine by means of the contacts whether the autonomous transport vehicle with the trolley cart has reached the correct parked position or terminal position on the tugger train trailer. For example, as soon as a control system of the autonomous transport vehicle has confirmed electrical contact, a driving movement can be stopped.

The charging contacts can be connected by means of a cable connection with additional tugger train trailers and/or a tractor vehicle to supply electric current to the charging contacts from a traction battery of a tractor vehicle.

The result is an interim recharging of the traction battery of the autonomous transport vehicles from the large traction battery of the tractor vehicle of the tugger train. This makes smooth long-term operation of the autonomous transport vehicles possible.

A plurality of trolley carts can advantageously be picked up.

The object of the invention is also accomplished by an autonomous transport vehicle with mating contacts as electrical connections for charging a traction battery of the transport vehicle, which can interact with charging contacts of a tugger train trailer, as described above with reference to the tugger train trailer.

The object of the invention is also accomplished in a transport system consisting of at least one tugger train trailer as described above and one autonomous transport vehicle, in particular an autonomous transport vehicle with mating contacts as electrical connections for charging a traction battery of the transport vehicle, which can interact with charging contacts of a tugger train trailer, and at least one trolley cart.

A wireless data connection between the autonomous transport vehicle and the tugger train trailer can be provided.

Traffic can be advantageously controlled by means of the data connection in terms of driving the autonomous transport vehicles onto the tugger train trailers and/or driving them off the tugger train trailers.

For example, data on the parked position and the dimensions of the tugger train trailer can be transmitted so that the autonomous transport vehicle can move the trolley cart into the optimal parked position. An exchange of data about the destination of the load carried by the trolley cart is also conceivable. In this manner, the autonomous transport vehicles do not require a constant data connection with the central system, but the information can be retrieved via the relay station of the tugger train trailer or of the tugger train.

The object of the invention is also accomplished by a transport method using a transport system as described above, whereby with a tugger train, autonomous transport vehicles, each with a trolley cart, are driven to a distribution point, at which trolley carts destined for the respective surrounding area are driven off by the autonomous transport vehicle from the tugger train trailer and driven to their destinations.

The advantage of this method is a lower volume of traffic. Safety in the operating site is also increased. Only tugger trains travel relatively long distances and the area in which a plurality of autonomous transport vehicles with their respective trolley carts are moving is restricted to the immediate vicinity of the distribution point.

Trolley carts that are already at the distribution point can be loaded onto the tugger train trailer for return transport.

It is also possible for the autonomous transport vehicles to set the trolley carts with their loads down and pick up an empty trolley cart so that it can be picked up again by the same tugger train. In the interest of a more rapid flow of trolley carts, however, it is also conceivable that drop-offs and pickups can be executed here at timed intervals, and the autonomous transport vehicles are picked up only by the next arriving tugger train.

BRIEF DESCRIPTION OF THE DRAWINGS

Additional advantages and details of the invention are explained with reference to the exemplary embodiments illustrated in the accompanying schematic figures, in which.

DESCRIPTION OF THE INVENTION

Figure 1:
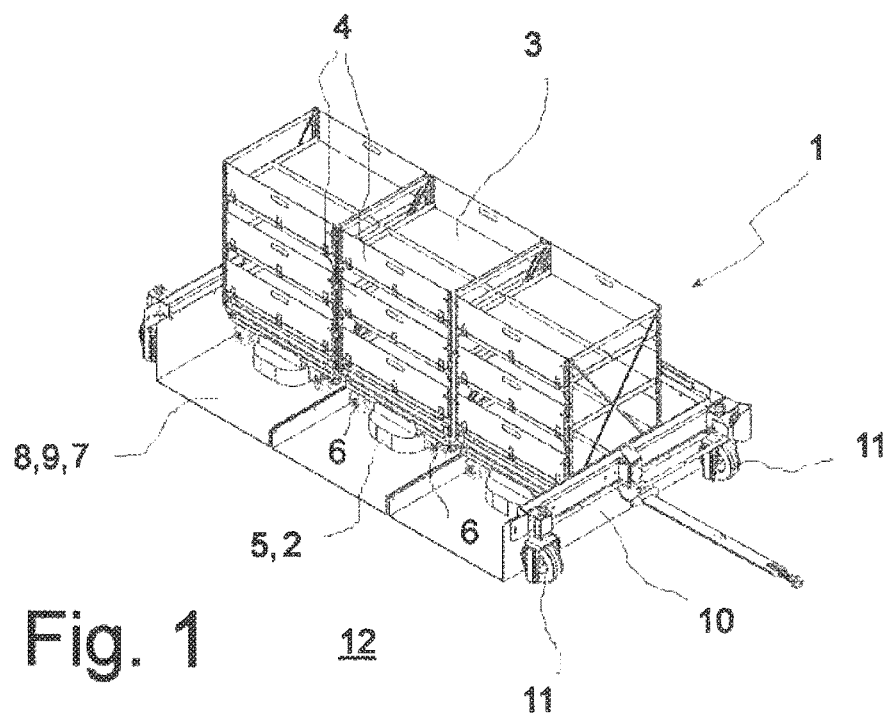
FIG. 1 shows the tugger train trailer according to the invention with autonomous transport vehicles and trolley cars.

FIG. 1 shows a tugger train trailer 1 according to the invention with autonomous transport vehicles 2 and trolley carts 3. The trolley cart 3 is constructed so that it has a plurality of drawers 4 for cargo. The autonomous transport vehicle 2 is an undermount vehicle 5 and projects on one side beyond the footprint of the trolley cart 3, whereby it is positioned between two trolley wheels 6. The trolley cart 3 is towed by the autonomous transport vehicle 2 on its own trolley wheels 6.

The tugger train trailer 1 has a base surface 7 which also serves as the drive-on surface 8 for the trolley carts 3 and as a transport vehicle drive-on surface 9 for the autonomous transport vehicle 2. The continuous base surface 7 is solidly connected with an encircling frame 10 of the tugger train trailer 1, and the wheels 11 of the tugger train trailer 1 are fastened by means of a lifting device to the frame 10 so that the base surface 7 can be lowered to the level of the ground 12. It is also conceivable to provide a tugger train trailer 1 without such a lifting device, if the trolley carts 3 or the autonomous transport vehicles 2 can overcome small steps and differences in levels.

The units consisting of an autonomous transport vehicle 2 and trolley carts 3 in this figure are all in the parked position in which they are driven all the way onto the tugger train trailer 1, whereby they are driven in "backwards" with the autonomous transport vehicle 2 oriented toward the side on which they will be driven out.

Figure 2:
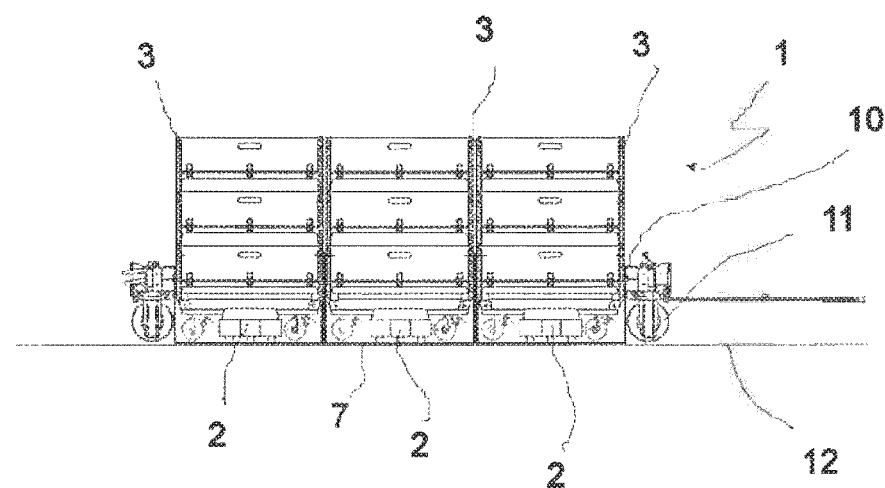
FIG. 2 shows the tugger train trailer illustrated in FIG. 1 in a side view.

FIG. 2 shows the tugger train trailer 1 illustrated in FIG. 1 in a side view. The base surface 7 is lowered until it is flush with the ground 12, whereby the frame 10 is lowered by the lifting device, which is not illustrated in any further detail, between the wheels 11 and the frame 10. The three trolley carts 3 located on the tugger train trailer 1 can each be removed from the autonomous transport vehicles 2 forward toward the observer.

Figure 3:
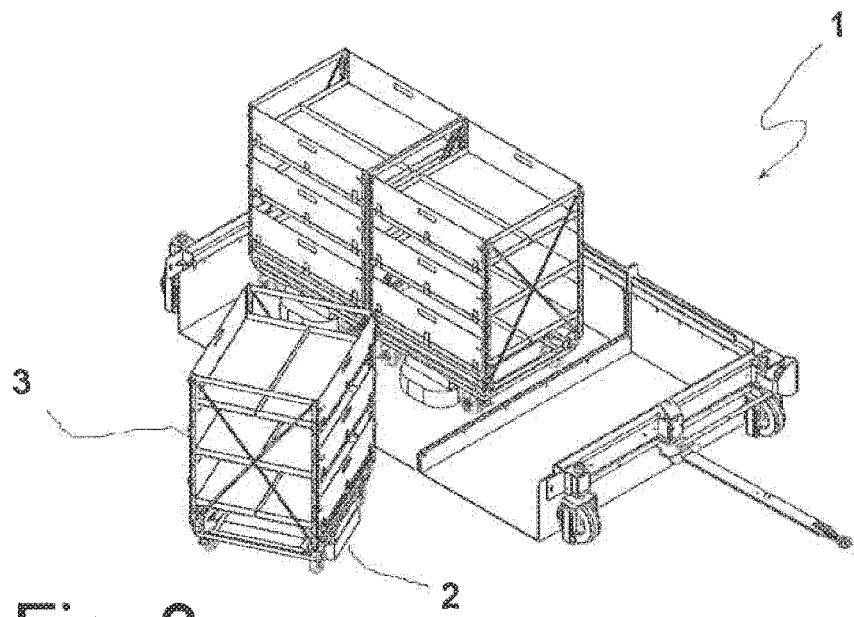
FIG. 3 shows the tugger train trailer illustrated in FIG. 1 with one trolley cart driven off.

FIG. 3 shows the tugger train trailer 1 illustrated in FIG. 1 with a trolley cart 3 removed. At a distribution point, the autonomous transport unit 2 drives the trolley cart 3 off the tugger train trailer 1.

Figure 4:
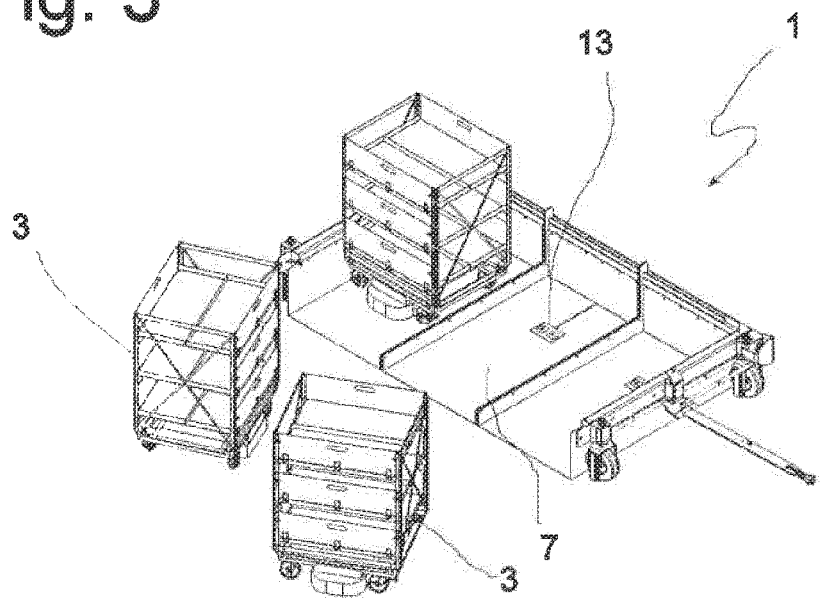
FIG. 4 shows the tugger train trailer illustrated in FIG. 1 with two trolley carts driven off and FIG. 5 shows the tugger train trailer illustrated in FIG. 1 with trolley carts driven off.

FIG. 4 shows the tugger train trailer 1 illustrated in FIG. 1 with two trolley carts 3 driven off. In this exemplary embodiment, charging contacts 13 are located in the base surface 7, which in the parked position of the unit consisting of the trolley cart 3 and autonomous transport vehicle 2 make it possible to recharge the traction battery of the autonomous transport vehicle 2 while it stays in the tugger train trailer 1.

Figure 5:
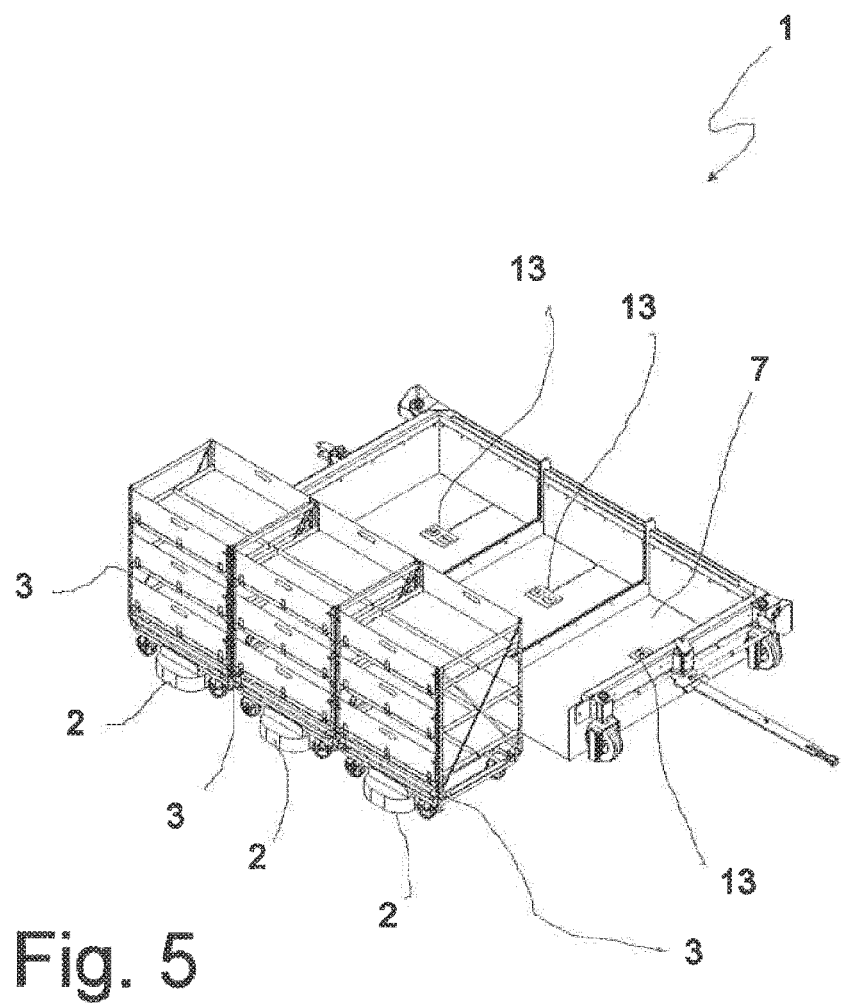

FIG. 5 shows the tugger train trailer 1 illustrated in FIG. 1 with three trolley carts 3 driven off. In the base surface 7 there is a charging contact 13 for each of the autonomous transport vehicles 2.

The invention claimed is:

1. A tugger train trailer comprising:
a frame; and
drive-on surfaces to accommodate at least one trolley cart, wherein additional transport vehicle drive-on surfaces are provided for an autonomous transport vehicle that moves the at least one trolley cart, so that a unit comprising the at least one trolley cart and the autonomous transport vehicle can drive on the transport vehicle drive-on surfaces; and
wherein electrical charging contacts are arranged so that the autonomous transport vehicle can charge a traction battery of the autonomous transport vehicle with mating contacts in a parked position of the tugger train trailer.

2. The tugger train trailer as recited in claim 1, wherein the drive-on surfaces and the transport vehicle drive-on surfaces form a continuous base surface.

3. The tugger train trailer as recited in claim 1, wherein the drive-on surfaces and the transport vehicle drive-on surfaces are configured to be lowered to floor level and raised.

4. The tugger train trailer as recited in claim 1, wherein the drive-on surfaces and the transport vehicle drive-on surfaces are firmly connected with the frame and lifting devices are provided between the frame and wheels of the tugger train trailer.

5. The tugger train trailer as recited in claim 1, wherein the electrical charging contacts are arranged so that contact is made only in a correct orientation of the autonomous transport vehicle.

6. The tugger train trailer as recited in claim 1, wherein the electrical charging contacts are connected by a cable connection with a tractor vehicle to supply electric current to electrical charging contacts from a traction battery of the tractor vehicle.

7. The tugger train trailer as recited in claim 1, wherein the at least one trolley cart comprises a plurality of trolley carts.

8. The tugger train trailer as recited in claim 1, wherein the autonomous transport vehicle has mating contacts to form electrical connections for the charging of the traction battery of the autonomous transport vehicle, the mating contacts adapted to interact with electrical charging contacts of the tugger train trailer.

9. A transport system, comprising:
at least one tugger train trailer, comprising:
a frame; and
drive-on surfaces to accommodate at least one trolley cart; and
an autonomous transport vehicle,
wherein additional transport vehicle drive-on surfaces are provided for the autonomous transport vehicle that moves the at least one trolley cart, so that a unit comprising the at least one trolley cart and the autonomous transport vehicle can drive on the transport vehicle drive-on surfaces,
wherein electrical contacts are arranged on the at least one tugger train trailer so that the autonomous transport vehicle can charge a traction battery of the autonomous transport vehicle with mating contacts of the autonomous transport vehicle in a parked position of the at least one tugger train trailer; and
wherein the autonomous transport vehicle has corresponding mating contacts to form electrical connections for the charging of the traction battery of the autonomous transport vehicle, the mating contacts adapted to interact with the electrical charging contacts of the at least one tugger train trailer.

10. The tugger train trailer as recited in claim 1, wherein a wireless data connection is provided between the autonomous transport vehicle and the tugger train trailer.

11. The tugger train trailer system as recited in claim 10, wherein via the data connection, traffic can be controlled with reference to the driving in of one of the autonomous transport vehicles onto the tugger train trailer and driving out of the tugger train trailer.

12. A transport method using the tugger train trailer as recited in claim 1, comprising driving the tugger train and the autonomous vehicles, each with a trolley cart, to a distribution point and at which distribution point trolley carts destined for respective surrounding areas are driven by the autonomous transport vehicle off the tugger train trailer and taken to their respective destinations.

13. The transport method as recited in claim 12, wherein trolley carts to be transported back that are already at the distribution point are driven onto the tugger train trailer.

14. The tugger train trailer as recited in claim 5, wherein the correct orientation comprises when the electrical charging contacts are oriented asymmetrically with respect to a longitudinal axis of the parked position in a drive-in direction of the autonomous vehicle.

15. The tugger train trailer as recited in claim 1, wherein the electrical charging contacts are connected by a cable connection with at least one additional tugger train trailers and a tractor vehicle.

* * * * *